(No Model.) 4 Sheets—Sheet 1.
F. BATEMAN.
FERTILIZER DISTRIBUTER AND SEED PLANTER.
No. 555,421. Patented Feb. 25, 1896.
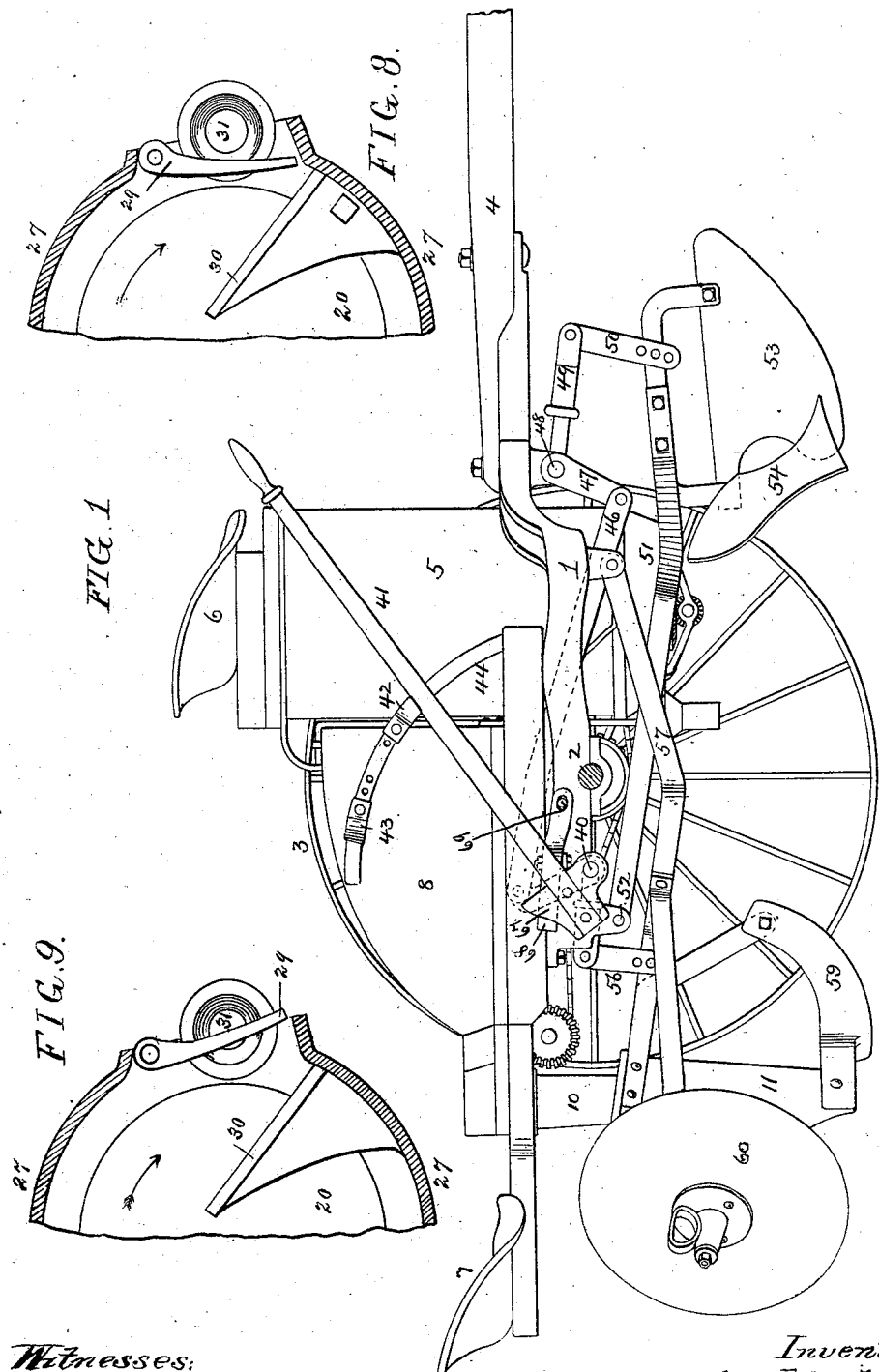
Witnesses:
Albert Pophniz,
K. E. Naumann
Inventor
Frank Bateman
By his Attorneys
Howson & Howson

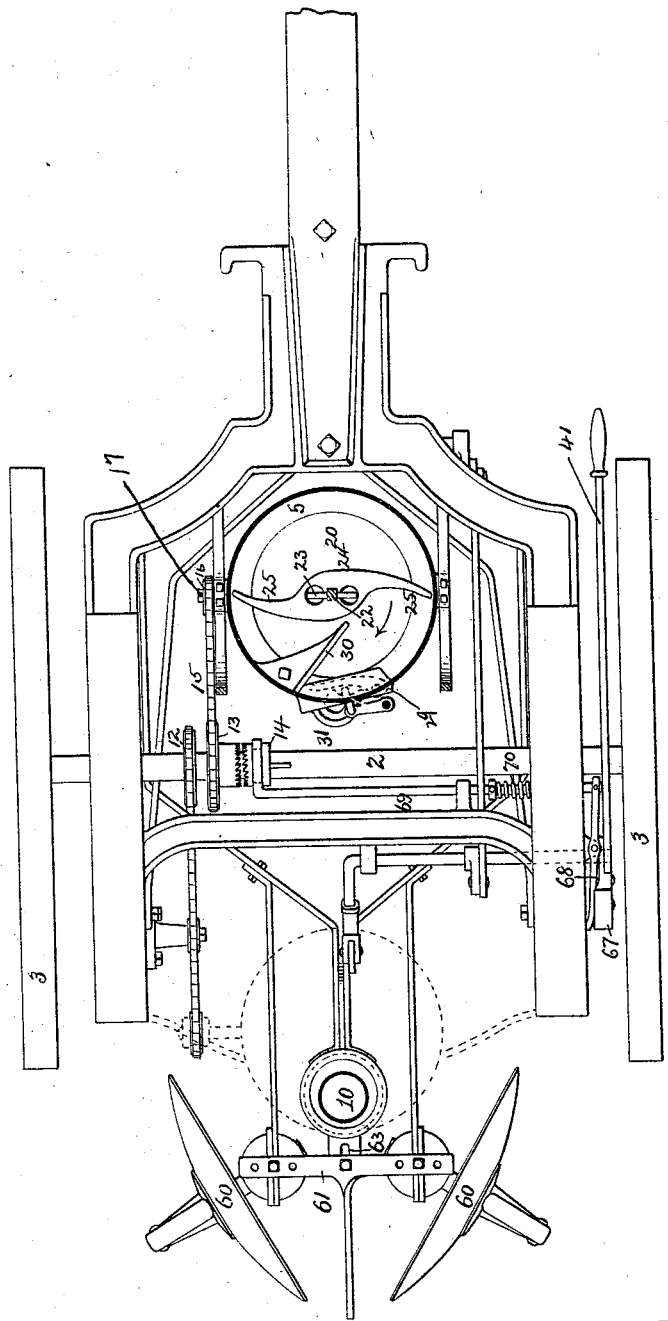

(No Model.)　　　　　　F. BATEMAN.　　　4 Sheets—Sheet 3.
FERTILIZER DISTRIBUTER AND SEED PLANTER.
No. 555,421.　　　　　　　　Patented Feb. 25, 1896.
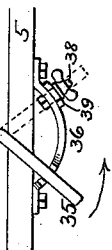
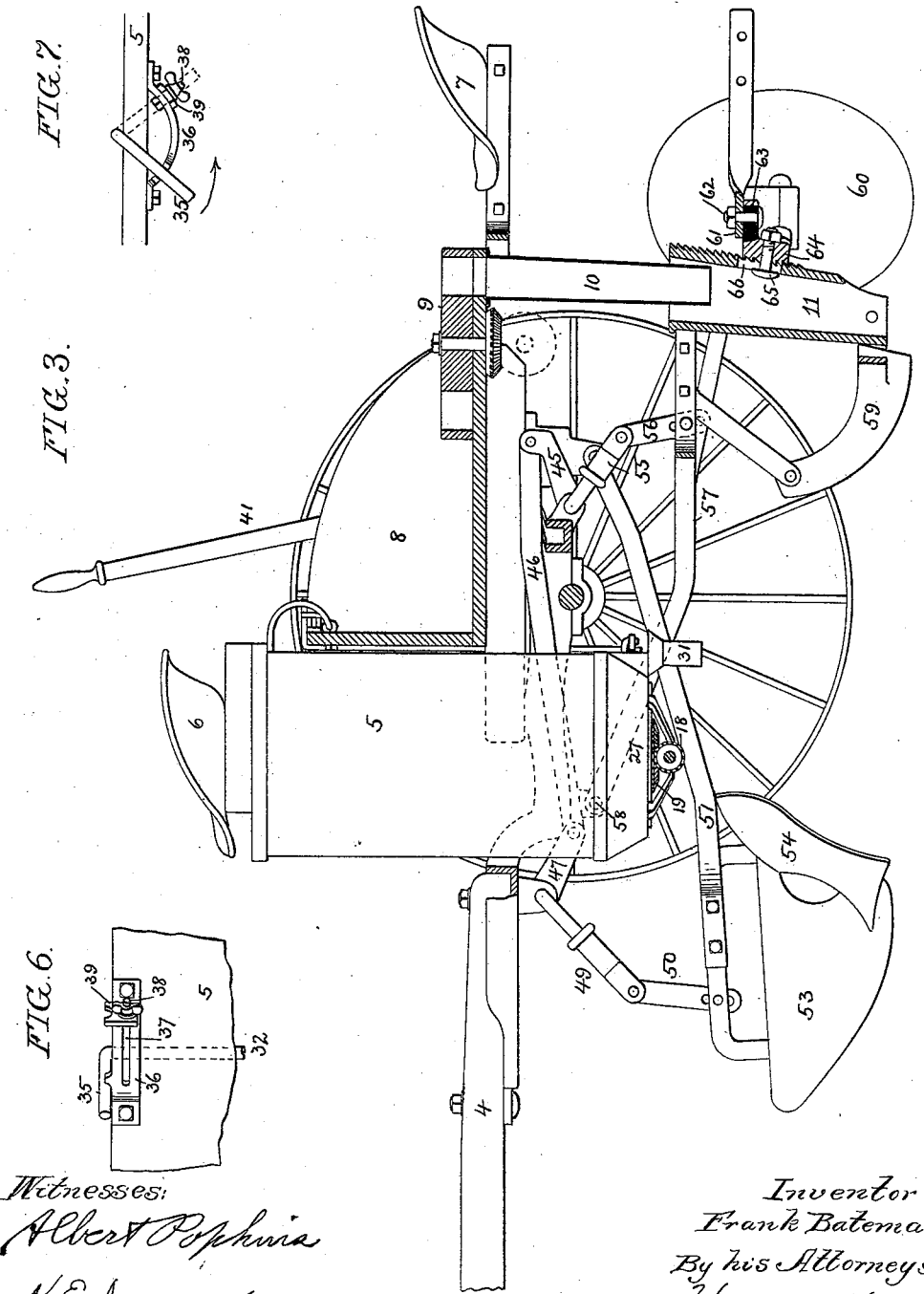
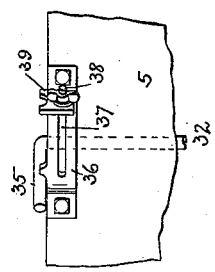
Witnesses:　　　　　　　　　　　　Inventor
Albert Popkins　　　　　　　　　Frank Bateman
K. E. Naumann.　　　　　　　　By his Attorneys.
　　　　　　　　　　　　　　　Howson & Howson.

(No Model.)  
4 Sheets—Sheet 4.
F. BATEMAN.
FERTILIZER DISTRIBUTER AND SEED PLANTER.
No. 555,421. Patented Feb. 25, 1896.
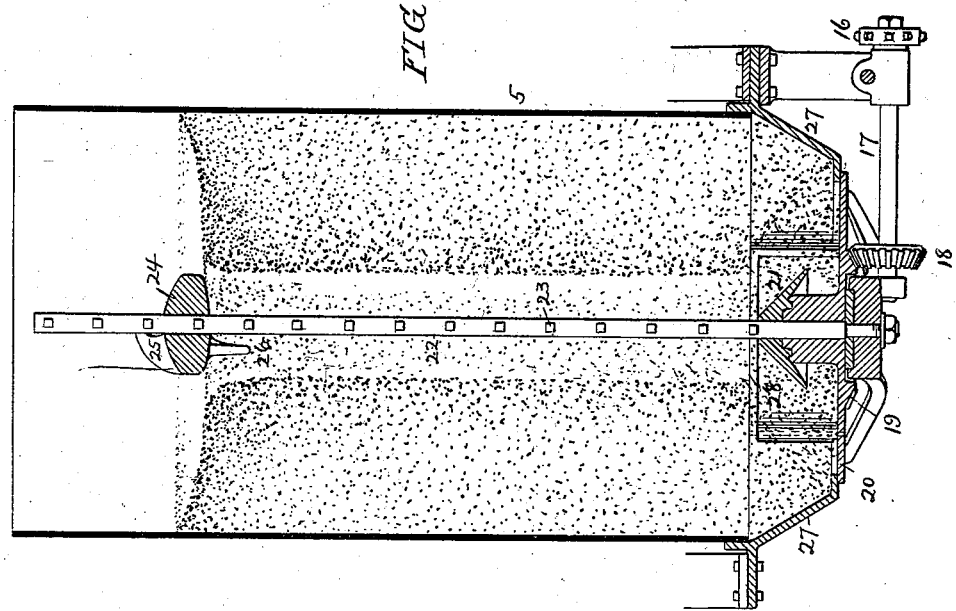
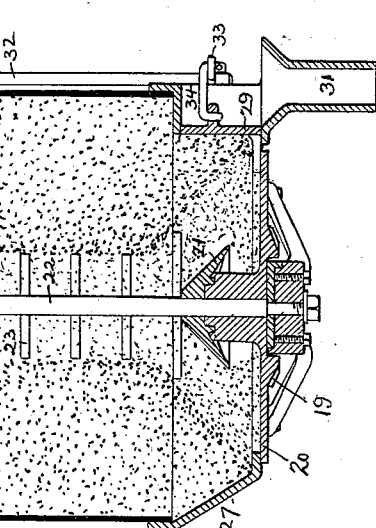
Witnesses:
F. D. Goodwin
Frank E. Bechtold
Inventor:
Frank Bateman
by his Attorneys
Howson & Howson

UNITED STATES PATENT OFFICE.

FRANK BATEMAN, OF GRENLOCH, NEW JERSEY, ASSIGNOR TO THE BATEMAN MANUFACTURING COMPANY, OF SAME PLACE.

FERTILIZER-DISTRIBUTER AND SEED-PLANTER.

SPECIFICATION forming part of Letters Patent No. 555,421, dated February 25, 1896.

Application filed February 19, 1895. Serial No. 539,004. (No model.)

*To all whom it may concern:*

Be it known that I, FRANK BATEMAN, a citizen of the United States, and a resident of Grenloch, Camden county, New Jersey, have invented certain Improvements in Fertilizer-Distributers and Seed-Planters, of which the following is a specification.

One object of my invention is to so construct a fertilizer-distributer or distributer and seed-planter as to provide for uniform and regulated discharge of fertilizer at all times, a further object being to provide for throwing the furrowing and covering devices of the machine into and out of operation by the manipulation of a single lever.

In the accompanying drawings, Figure 1 is a side view of part of a planting-machine with my improved fertilizer-distributer, one of the supporting-wheels being removed. Fig. 2 is a plan view of the same, partly in section. Fig. 3 is a view, partly in elevation and partly in longitudinal section, through the center of the machine. Fig. 4 is a longitudinal section of the fertilizer-hopper and its appurtenances.
Fig. 5 is a transverse section of the same. Figs. 6 and 7 are respectively a side view and a plan view of a retaining device used in connection with the mechanism for operating the gate which regulates the discharge of the fertilizer. Fig. 8 is a sectional plan view showing the discharge-regulating gate closed, so as to prevent the access of fertilizer to the discharge-spout; and Fig. 9 is a similar view showing the discharge-regulating gate adjusted so as to permit a flow of fertilizer to and through the discharge-spout.

The machine has a frame 1 mounted upon the axle 2, which is provided with opposite supporting and traction wheels 3, the front end of the frame having the draft-pole 4 or being otherwise constructed for the attachment of the team.

The fertilizer-hopper 5 is mounted in the front portion of the frame and is surmounted by the driver's seat 6, and there is also at the rear end of the frame a seat 7 for another attendant, my invention being illustrated in connection with a potato-planting machine provided with a receptacle 8 for the reception of the cut potatoes or seed, and a rotating pocketed disk 9 for feeding the seed successively to the discharge-spout 10, from which they pass through a delivery-spout 11 into the furrow. It should be understood, however, that my invention is not limited to a potato-planting machine, but can be used in connection with any form of planter or as a fertilizer-distributer alone, if desired.

On the axle are two sprocket-wheels 12 and 13, the wheel 12 driving the seed-dropper 9 and the wheel 13 driving the movable parts of the fertilizer-distributer, said wheel 13 having a toothed hub and being loose on the axle 2, but capable of being clutched thereto by an adjustable clutch-sleeve 14, operated as hereinafter described.

A sprocket-chain 15 extends from the wheel 13 to a sprocket-wheel 16 on a transverse shaft 17 mounted in bearings beneath the hopper 5, said shaft having at its inner end a bevel-pinion 18 meshing with a bevel-wheel 19 formed upon the under side of a plate 20 which covers an opening in the base 27 of the hopper and constitutes the movable bottom of said hopper.

The plate 20 has a central hub provided with a conical cap 21, and from said hub projects upwardly a shaft 22, which turns with the hub and has a series of projecting fingers 23.

Mounted upon the upper portion of the shaft 22 and turning therewith, but free to slide vertically thereon, is a scraper consisting of a central hub 24, having projecting arms 25 with depending ribs 26, the hub being recessed, so as to slip down over the shaft and its fingers 23, the arms 25 with their depending ribs 26 being thus supported only by the mass of fertilizer in the hopper.

Ordinary powdered or granular fertilizing material has a tendency to form an arch across the hopper at the bottom of the same. Hence distributing mechanism acting only upon the mass of fertilizer at the bottom of the hopper is not effective. Therefore I use in connection with the upright shaft 22 short fingers which agitate the mass only at and near the center of the same and thus form at this point a sort of well, in which the powdered material is free to fall to the bottom of the hopper, or in which the material is maintained in a much looser state than in the surrounding portions of the mass, and I use the scrapers at the top of the mass of fertilizing material for the purpose of directing the latter into this well, in which it can freely descend to the distributing devices at the bottom of the hopper, the scrapers being prevented from burrowing into the mass of fertilizer owing to the bearing which the arms 25 have upon the top of said mass.

At one side of the base 27 of the hopper is an opening 28, in which is pivoted a horizontal-swinging gate 29, and projecting from one side of the base of the hopper, so as to bear upon the rotating bottom plate 20 of the same, is an inclined deflector-plate 30, as shown in Fig. 2. Hence as the fertilizer is carried around by said rotating bottom plate in the direction of the arrow, Fig. 2, it is brought into contact with the inclined deflector-plate 30 and is directed by the latter outwardly against the gate 29, which can be adjusted so as to uncover more or less of the upper flaring end of the fertilizer-distributer spout 31, the amount of fertilizer passing through said spout in a given time being dependent upon the extent of opening into the spout afforded by the adjustment of the gate 29. (See Figs. 8 and 9.)

The adjustment is effected by means of a vertical shaft 32 adapted to suitable bearings on the fixed frame and having at the lower end an arm 33, which is connected to the gate 29 by a link 34, the upper end of the shaft being bent outward so as to form a handle 35 which is adapted to a retainer consisting of a segmental plate 36 mounted at the top of the hopper and having a slot 37 for the reception of a bolt 38 which serves to confine in place on said segmental plate 36 a block 39, having a notch in its upper edge. A notch is also formed in the upper edge of the plate 36, and when the handle occupies this notch, as shown in Figs. 6 and 7, the gate 29 is closed, as shown in Fig. 4, but by moving the handle in the direction of the arrow, Fig. 7, until it occupies the notch of the block 39, the gate 29 will be opened to an extent corresponding with the adjustment of said block 39 on the plate 36, and this adjustment can be varied so as to provide for any desired extent of opening of the gate.

A shaft 40 is adapted to suitable bearings on the fixed frame of the machine, and this shaft has at one end an operating-lever 41, the upper end of which is within convenient reach of the occupant of the driver's seat 6, this lever when depressed being held by contact with a stop 42, and when elevated being held by contact with a stop 43, said stops being adjustably mounted on a segment 44, and the lever having sufficient lateral spring to permit it to be withdrawn from engagement with either stop prior to elevation or depression of the lever.

The shaft 40 has an arm 45 connected by a link 46 to an arm 47 on a shaft 48 at the front end of the frame, and said shaft 48 has an arm 49 connected by an adjustable link 50 to the hanger-frame 51 which carries the furrowing devices, said frame being mounted upon pivot-pins 52 at the rear of the fixed frame and the furrowing devices consisting of a central divider-plate 53 and opposite moldboards 54.

On the shaft 40 is another arm 55 which is connected by an adjustable link 56 to the hanger-frame 57 which carries the covering devices, said frame being hung to pivot-pins 58 at the front end of the frame 2 and carrying at its rear end the delivery-spout 11, furrow-opening blade 59 and a pair of oppositely-inclined concavo-convex covering-blades 60.

The spindles of the covering-blades 60 are pivotally mounted in hangers which can be adjusted to different lateral positions on a bar 61, having at each end a series of openings for the reception of the hanger-bolt, said bar 61 being provided with a bolt 62, which is adapted to a slot 63 in a bracket 64, having a serrated front face engaging with the correspondingly serrated rear face of the delivery-spout 11, said bracket 64 being secured to the delivery-spout by means of a bolt 65 adapted to a vertical slot 66 in said spout. By this means the vertical, longitudinal, and lateral adjustment of the covering-blades 60 is provided for and angular adjustment of said blades in respect to each other can also be effected by swinging the same upon their hangers.

The lever 41 has at the lower end a cam 67, which, when said lever is depressed, as shown in Fig. 1, acts upon the rear arm of a lever 68, hung to a bracket on the side of the machine, the front arm of said lever having a pivotal connection with a rod 69, which engages with the clutch-sleeve 14, whereby the sprocket-wheel 13 is clutched to the driving-axle, the effect of this movement of the lever being to draw the clutch-sleeve 14 out of driving connection with the hub of the sprocket-wheel. When the lever 41 is, however, raised to the position shown in Fig. 3, the lever 68 is free from the influence of the cam 67 and the clutch-sleeve 14 can be thrown into engagement with the hub of the sprocket-wheel 13 by means of a spring 70, acting on a collar on the rod 69. Owing to this construction and combination of parts, the depression of the lever 41 simultaneously effects the raising out of action of the furrowing and covering devices and the throwing out of operation of the fertilizer-distributing mechanism, elevation of the lever throwing said fertilizer-distributing devices again into action and simultaneously lowering into operative position the furrowing and covering blades.

Having thus described my invention, I claim and desire to secure by Letters Patent—

1. A fertilizer-distributer consisting of a vertical hopper or casing having a vertical shaft with projecting stirrers, means for rotating said shaft, and a gravitating scraper rotating with the shaft and adapted to rest upon the mass of fertilizer and to descend upon the shaft as the level of said mass is lowered.

2. A fertilizer-distributer consisting of a vertical hopper or casing having a vertical shaft with short projecting stirrers adapted to act only upon the central portion of the mass of fertilizer within the hopper, means for rotating said shaft, and a gravitating scraper rotating with the shaft and adapted to rest upon the mass of fertilizer, and to descend upon the shaft as the level of said mass is lowered.

3. A fertilizer-distributer consisting of a hopper having a base with opening in one side, a vertical discharge-spout, a rotating bottom plate and a laterally-adjustable valve or gate adapted to swing horizontally over the mouth or upper end of said vertical discharge-spout so as to govern the area of inlet thereinto, substantially as specified.

4. A fertilizer-distributer consisting of a hopper having a base with discharge-opening at one side, a swinging gate in said opening, a vertical shaft connected to said gate by a link at the lower end, and a retainer for said shaft, consisting of a notched segment engaging with a laterally-projecting arm or handle at the upper end of the shaft, substantially as specified.

5. The combination of the furrowing-blades carried by a frame hung to the rear of the machine, the covering-blades carried by a frame hung to the front of the machine, a shaft having an arm connected by a link to the frame carrying the covering-blades, a second shaft having an arm connected by a link to the frame carrying the furrowing-blades, a link connecting arms on said shafts, whereby movement of one is imparted to the other, and an operating-lever secured to one of the shafts, substantially as specified.

6. The combination of the covering-wheels, the delivery-spout, a bracket vertically adjustable on said spout, a cross-bar longitudinally adjustable on said bracket, and covering-wheel hangers adjustable laterally on said cross-bar, substantially as specified.

In testimony whereof I have signed my name to this specification in the presence of two subscribing witnesses.

FRANK BATEMAN.

Witnesses:
　WALTER E. KING,
　H. B. COLES.